United States Patent
Dogo et al.

(10) Patent No.: US 8,495,399 B2
(45) Date of Patent: Jul. 23, 2013

(54) COMMUNICATION APPARATUS AND METHOD OF CONTROLLING COMMUNICATION APPARATUS WITH REDUCED POWER CONSUMPTION

(75) Inventors: Yuki Dogo, Kagoshima (JP); Yukio Okamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 277 days.

(21) Appl. No.: 13/019,434

(22) Filed: Feb. 2, 2011

(65) Prior Publication Data
US 2011/0191613 A1 Aug. 4, 2011

(30) Foreign Application Priority Data
Feb. 3, 2010 (JP) ................. 2010-021891

(51) Int. Cl.
*G06F 1/32* (2006.01)
(52) U.S. Cl.
USPC ............................ 713/310; 713/323; 713/324
(58) Field of Classification Search
USPC ................................. 713/310–324
See application file for complete search history.

(56) References Cited

U.S. PATENT DOCUMENTS

| | | | |
|---|---|---|---|
| 7,577,857 B1 * | 8/2009 | Henderson et al. ........... | 713/320 |
| 8,001,404 B2 * | 8/2011 | Pathak ........................... | 713/320 |
| 8,068,433 B2 * | 11/2011 | Hodges et al. ................. | 370/245 |
| 8,181,055 B2 * | 5/2012 | Zhao et al. ..................... | 713/340 |
| 8,261,113 B2 * | 9/2012 | Yasuda .......................... | 713/320 |
| 2011/0107116 A1 * | 5/2011 | Diab et al. ..................... | 713/300 |
| 2011/0138201 A1 * | 6/2011 | Park ............................... | 713/310 |
| 2012/0131369 A1 * | 5/2012 | Paljug ............................ | 713/323 |
| 2012/0239948 A1 * | 9/2012 | Katoh ............................ | 713/310 |

FOREIGN PATENT DOCUMENTS
JP 2003-108273 4/2003

\* cited by examiner

*Primary Examiner* — Glenn A Auve
(74) *Attorney, Agent, or Firm* — Maschoff Brennan

(57) ABSTRACT

A communication apparatus which is connected to an information processing apparatus so as to operate dependent on the information processing apparatus and connects the information processing apparatus and an external apparatus, includes a judgment unit which judges instruction information transmitted from the external apparatus, a storage unit which stores the instruction information, a transmission unit which detects whether the information processing apparatus is in a normal state in which power is consumed normally or a power-saving state in which power consumption is reduced, and transmits the instruction information stored by the storage unit to the information processing apparatus when the information processing apparatus is in the normal state, and a switching unit which switches the communication apparatus to the normal state if the judgment unit judges that the instruction information is an instruction for directing the operation when the communication apparatus is in the power-saving state.

5 Claims, 3 Drawing Sheets

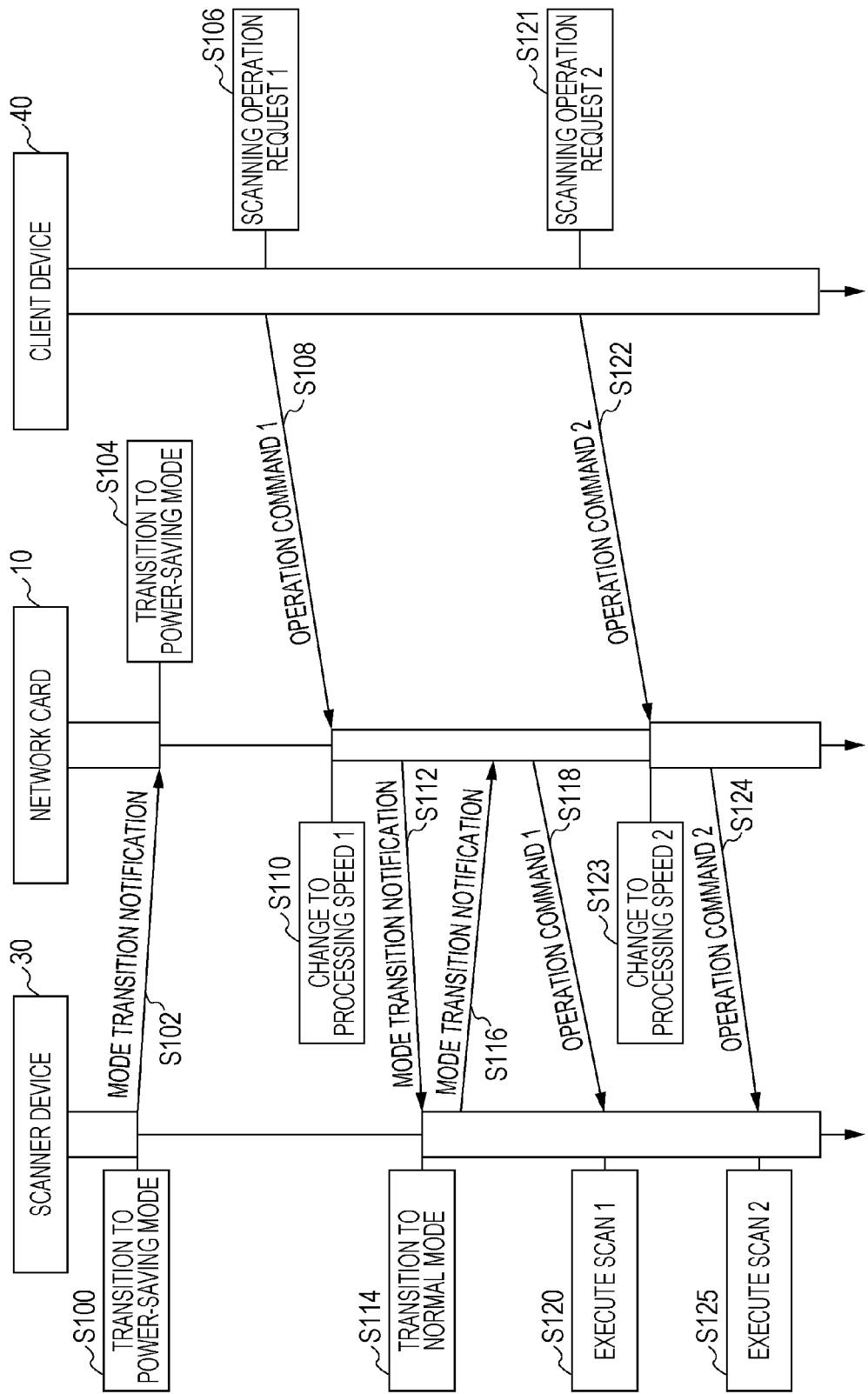

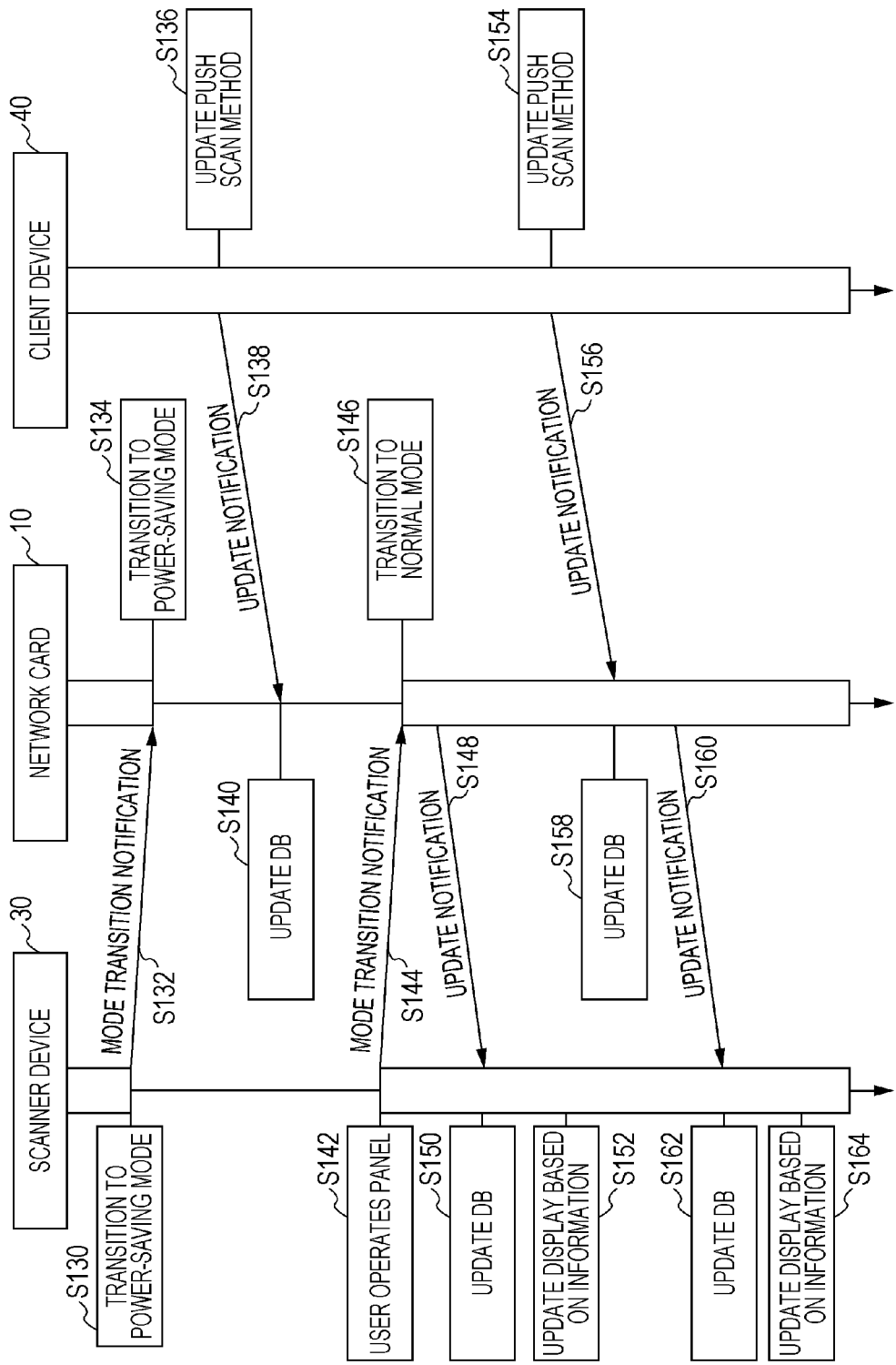

COMMUNICATION APPARATUS AND METHOD OF CONTROLLING COMMUNICATION APPARATUS WITH REDUCED POWER CONSUMPTION

This application claims a priority to Japanese Patent Application No. 2010-021891 filed on Feb. 3, 2010 which is hereby expressly incorporated by reference herein in its entirety.

BACKGROUND

1. Technical Field

The present invention relates to a communication apparatus and a method of controlling the communication apparatus.

2. Related Art

A LAN board functioning as a node of a LAN (Local Area Network) by attaching to an information device has to monitor the flow of packet data on the LAN all the time. Therefore, the LAN board has to be operated by receiving power supply at a constant level all the time such that power supply to an entire internal circuit is not cut off.

In order to reduce power consumption of an information device equipped with such LAN board, there is a following technique disclosed in JP-A-2003-108273. In the technique disclosed in JP-A-2003-108273, after a predetermined period of time has passed in a stand-by state, the LAN board transitions to an operation stand-by state with a power-saving operation mode. Then, if the LAN board detects a packet addressed thereto on a LAN, or if the LAN board detects a packet to be transmitted to the information device, the LAN board returns to an operation stand-by state which is not the power-saving operation mode but a normal operation mode. At the same time, the LAN board makes the information device be in an operation stand-by state with a normal operation mode, and then, transmits the packet to the information device.

However, depending on information contents included in a packet, even when the packet is does not need to be transmitted to the information device immediately, the information device also returns to the operation stand-by state with the normal operation mode together with the LAN board. Therefore, power consumption of the information device equipped with the LAN board cannot be effectively reduced.

SUMMARY

An advantage of some aspects of the invention is to provide a technique of reducing power consumption of an information device equipped with a LAN board.

The aspects of the invention is to solve at least one of the issues mentioned above and can be realized as the following modes or Application Examples.

Application Example 1

A communication apparatus according to the Application Example, which is connected to an information processing apparatus so as to operate dependent on the information processing apparatus and connects the information processing apparatus and an external apparatus so as to allow communication therebetween, includes a judgment unit which acquires and analyzes instruction information transmitted from the external apparatus to the information processing apparatus, judges whether the instruction information is an instruction for directing the information processing apparatus to execute a predetermined operation, and transmits the instruction information to the information processing apparatus if the instruction information is an instruction for directing the predetermined operation, a storage unit which stores the instruction information if the judgment unit judges that the instruction information is an instruction not for directing the predetermined operation, a transmission unit which detects whether the information processing apparatus is in a normal state in which power is consumed normally or a power-saving state in which power consumption is reduced, and transmits the instruction information stored by the storage unit to the information processing apparatus when the information processing apparatus is in the normal state, and a switching unit which switches the communication apparatus to the normal state in which power is consumed normally if the judgment unit judges that the instruction information is an instruction for directing the predetermined operation when the communication apparatus is in the power-saving state in which power consumption is reduced.

With the configuration, as a result of analysis of the instruction information transmitted from the external apparatus to the information processing apparatus, if the instruction information is judged to be an instruction for directing the information processing apparatus to execute a predetermined operation when the communication apparatus itself is in the power-saving state, the communication apparatus switches itself to the normal state. Therefore, the communication apparatus transitions to the normal state without waiting until the information processing apparatus transitions to the normal state, whereby information processing apparatus efficiently consumes power. In addition, communication between the information processing apparatus and the external apparatus can be performed quickly in comparison with that in the power-saving state. Further, if the instruction information is judged to be an instruction not for directing the information processing apparatus to execute a predetermined operation, the communication apparatus stores the instruction information. Then, when the information processing apparatus is in the normal state in which power is consumed normally, the stored instruction information is transmitted to the information processing apparatus. Accordingly, the instruction information not for directing the predetermined operation is not transmitted to the information processing apparatus when the information processing apparatus is in the power-saving state in which power consumption is reduced and is transmitted when the information processing apparatus is in the normal state. Therefore, power consumption of the information processing apparatus to which the communication apparatus is connected can be reduced.

Application Example 2

In the communication apparatus according to the above Application Example, it is preferable that the switching unit switch the communication apparatus to the normal state from the power-saving state in a stepwise manner in accordance with an instruction for directing the predetermined operation.

With the configuration, power can be efficiently consumed in a stepwise manner in accordance with an instruction for directing the predetermined operation.

Application Example 3

In the communication apparatus according to the above Application Example, it is preferable that the power-saving state be a state in which a speed of processing a task is reduced.

Application Example 4

In the communication apparatus according to the above Application Example, it is preferable that if the transmission unit detects that the information processing apparatus has transitioned from the power-saving state to the normal state, the transmission unit transmit the instruction information stored by the storage unit to the information processing apparatus immediately.

With the configuration, the instruction information stored while the information processing apparatus is in the power-saving state is transmitted to the information processing apparatus in the order of being stored when the information processing apparatus transitions to the normal state.

Application Example 5

In the communication apparatus according to the above Application Example, it is preferable that the storage unit be detachably attached to the communication apparatus.

Application Example 6

According to the Application Example, there is provided a method of controlling a communication apparatus which is connected to an information processing apparatus so as to operate dependent on the information processing apparatus and connects the information processing apparatus and an external apparatus so as to allow communication therebetween, the method includes: judging process by acquiring and analyzing instruction information transmitted from the external apparatus to the information processing apparatus, whether the instruction information is an instruction for directing the information processing apparatus to execute a predetermined operation, a first transmitting process of transmitting the instruction information to the information processing apparatus if the instruction information is judged to be an instruction for directing the predetermined operation in the judging process, a storing process of storing the instruction information if the instruction information is judged to be an instruction not for directing the predetermined operation in the judging process, a second transmitting process of detecting whether the information processing apparatus is in a normal state in which power is consumed normally or a power-saving state in which power consumption is reduced to transmit the instruction information stored in the storing process to the information processing apparatus when the information processing apparatus is in the normal state, and a switching process of switching the communication apparatus to the normal state in which power is consumed normally if the instruction information is judged to be an instruction for directing the predetermined operation in the judging process when the communication apparatus is in the power-saving state in which power consumption is reduced.

With the method, as a result of analysis of the instruction information transmitted from the external apparatus to the information processing apparatus, if the instruction information is judged to be an instruction for directing the information processing apparatus to execute a predetermined operation when the communication apparatus itself is in the power-saving state, the communication apparatus switches itself to the normal state. Therefore, the communication apparatus transitions to the normal state without waiting until the information processing apparatus transitions to the normal state, whereby power is consumed efficiently. In addition, communication between the information processing apparatus and the external apparatus can be performed quickly in comparison with that in the power-saving state. Further, if the instruction information is judged to be an instruction not for directing the information processing apparatus to execute a predetermined operation, the communication apparatus stores the instruction information. Then, when the information processing apparatus is in the normal state in which power is consumed normally, the stored instruction information is transmitted to the information processing apparatus. Accordingly, the instruction information not for directing the predetermined operation is not transmitted to the information processing apparatus when the information processing apparatus is in the power-saving state in which power consumption is reduced and is transmitted when the information processing apparatus is in the normal state. Therefore, power consumption of the information processing apparatus to which the communication apparatus is connected can be reduced.

BRIEF DESCRIPTION OF THE DRAWINGS

The invention will be described with reference to the accompanying drawings, wherein like numbers reference like elements.

FIG. 2 is a flowchart illustrating flows of processing an operation command in the scanner device, the network card and a client device.

FIG. 3 is a flowchart illustrating flows of processing a non-operation command in the scanner device, the network card and the client device.

DESCRIPTION OF EXEMPLARY EMBODIMENTS

Figure 1:
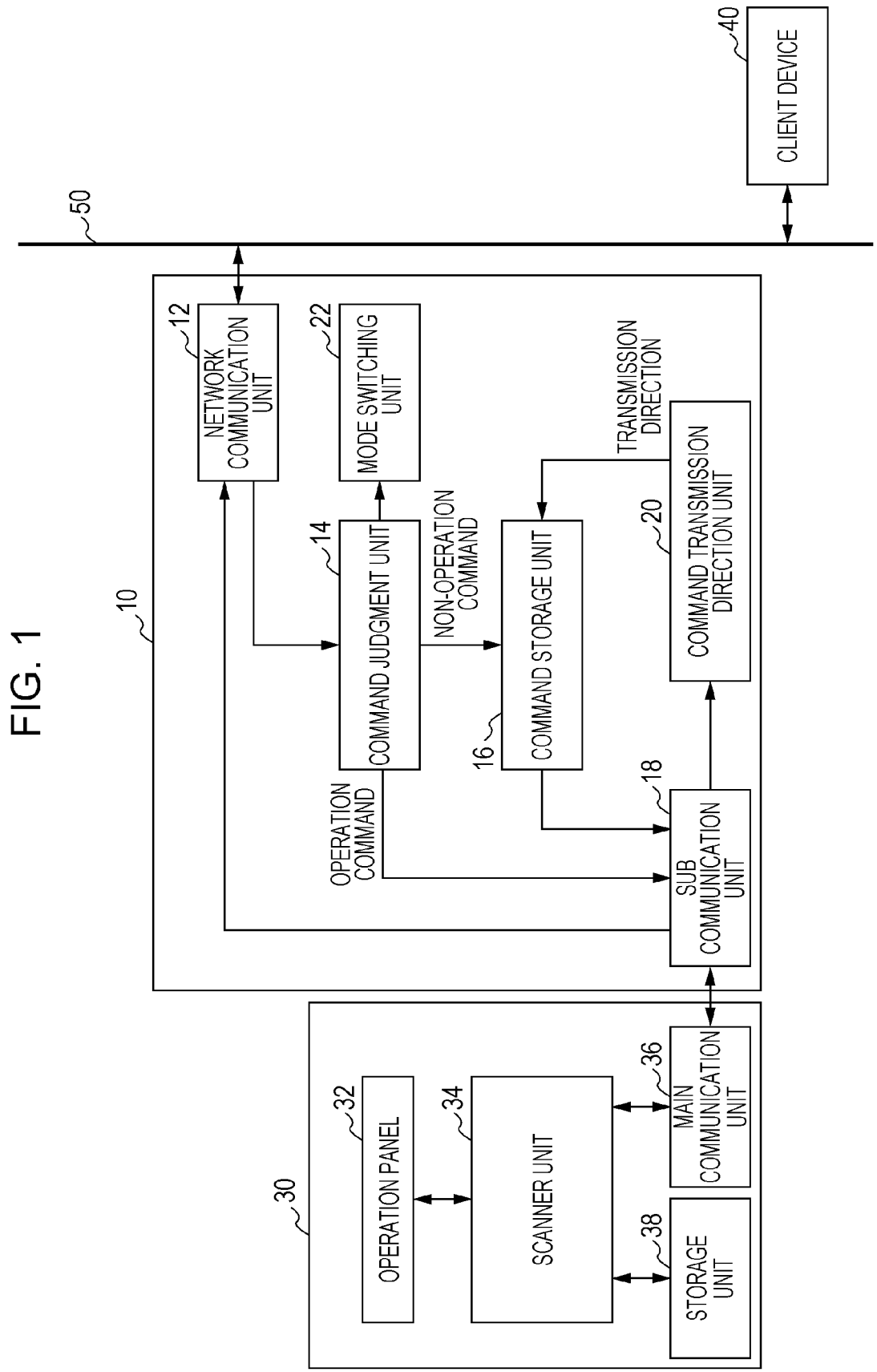
FIG. 1 is a block diagram illustrating configurations of a scanner device and a network card according to an embodiment of the invention.

Hereinafter, a communication apparatus according to the invention will be described with reference to drawings.

Embodiment

FIG. 1 is a block diagram illustrating configurations of a scanner device 30 as an information processing apparatus and a network card 10 as a communication apparatus according to the embodiment of the invention.

The scanner device 30 includes a scanner unit 34 having a scanning function, an operation panel 32 with which a user operates the scanner device 30, a main communication unit 36 which communicates with the network card 10 which is attached to the scanner device 30, and a storage unit 38 which stores various settings in a database (DB).

Both of push scanning and pull scanning can be performed with the scanner device 30. That is, when the pull scanning is performed, the scanner unit 34 starts to read a document in accordance with a reading instruction transmitted from a client device 40. The client device 40 is an external apparatus connected to a LAN 50. Then, the scanner unit 34 transmits image data of the read document to the client device 40. Further, when the push scanning is performed, if an operation for directing the scanner device 30 to read a document is performed on the operation panel 32, the scanner unit 34 starts to read the document. Then, the scanner unit 34 transmits image data of the read document to the client device 40 specified by a user.

Further, the scanner device 30 has a function of transitioning from a normal state (normal mode) to a power-saving state (power-saving mode) when a scanner operation is not executed for a predetermined period of time. In the normal state, a defined power is consumed. In the power-saving state, functions other than minimum essential functions are stopped so that power consumption is reduced. On the other hand, when a user operates the operation panel 32 to direct the scanner device 30 to execute push scanning, or when pull scanning is requested to be executed by the client device 40, the scanner device 30 transitions from the power-saving mode to the normal mode. In the embodiment, it is configured that when a mode of the scanner device 30 is switched, a notification indicating that a mode of the scanner device 30 has transitioned is transmitted from the main communication unit 36 to a sub communication unit 18.

Further, the scanner device 30 includes a CPU (Central Processing Unit), a ROM (Read Only Memory), a RAM (Random Access Memory), a light source, an optical system, a photoelectric conversion element, a scanning driving system, an auto document feeder (ADF), a liquid crystal panel, and the like as hardware. It is to be noted that any of these members are not illustrated in the drawing. In the embodiment, the scanner device 30 is supposed to be a device having a single function. However, the scanner device 30 is not limited thereto and may be in a form of a complex machine having a printing function and a copying function.

The network card 10 is attached to the scanner device 30 and connects the scanner device 30 and the LAN 50 so as to allow communication therebetween as a node on the LAN 50. The network card 10 includes a network communication unit 12, a command judgment unit 14, a command storage unit 16, the sub communication unit 18, a command transmission direction unit 20 and a mode switching unit 22.

The network card 10 includes a CPU, a ROM, a RAM, a flush memory and a MAC (Media Access Control) controller, and the like as hardware. It is to be noted that any of these members are not illustrated in the drawing.

The network card 10 operates dependent on the scanner device 30 in principle. Accordingly, if the scanner device 30 transitions from the normal mode to the power-saving mode, the network card 10 also transitions from a normal mode to a power-saving mode. On the other hand, if the scanner device 30 transitions from the power-saving mode to the normal mode, the network card 10 also transitions from the power-saving mode to the normal mode. In the embodiment, if the network card 10 transitions to the power-saving mode, power consumption of the network card 10 is reduced as follows. That is, a speed of processing tasks to be executed by the CPU (processing speed) or a communication speed of the network is reduced so that power consumption of the network card 10 is reduced. It is to be noted that a controller which changes the processing speed of the CPU is disclosed in JP-A-2009-282998, for example. Further, a control method of changing the communication speed of the network is disclosed in JP-A-2009-49602, for example. In addition, the network card 10 can transition from the power-saving mode to the normal mode in accordance with instruction information (command) which is transmitted from the client device 40 regardless of modes of the scanner device 30.

The network communication unit 12 transmits and receives information to and from the client device 40 through the LAN 50 based on a hierarchized protocol such as an OSI (Open System Interconnection) reference model.

The sub communication unit 18 has a function of communicating with the scanner device 30. It is to be noted that although in the embodiment, the main communication unit 36 and the sub communication unit 18 are supposed to communicate with each other through a USB (Universal Serial Bus), a way of communication therebetween is not limited thereto.

The command judgment unit 14 acquires information transmitted from an external node such as the client device 40, which is connected to the LAN 50. Then, the command judgment unit 14 analyzes the acquired information so as to judge whether the information is a command for directing the scanner device 30 to execute a predetermined operation.

In the embodiment, the command judgment unit 14 acquires and analyzes information received by the network communication unit 12. At this time, the command judgment unit 14 may include a FIFO (First-In First-Out) memory, temporarily hold the received information in the FIFO memory and sequentially analyze the information. Subsequently, the command judgment unit 14 judges whether the received information is a command for directing the scanner device 30 to execute an operation. As a result of the judgment, if the information is an operation command which requests the scanner device 30 to execute a scanning operation such as a scan execution request, the network card 10 directs the mode switching unit 22 to switch a mode. At this time, when the network card 10 is in the power-saving mode, the mode transitions to the normal mode. Further, the network card 10 notifies the scanner device 30 of the transition of the mode of the network card 10. Then, when the scanner device 30 transitions to the normal mode, the operation command is immediately transmitted from the sub communication unit 18 to the scanner device 30.

On the other hand, as a result of the judgment, when the information is a non-operation command which does not request the scanner device 30 to execute a scanning operation, such as a command for directing the scanner device 30 to update a push scan method, the following operations are performed. That is, in such a case, if the network card 10 is in the power-saving mode, the network card 10 remains in the power-saving mode. Further, the command is transmitted to the command storage unit 16 so as to be stored in the command storage unit 16. It is to be noted that the command may be stored in a flush memory or the like in the network card 10 or may be stored in an external storage medium such as a memory card, which is detachable.

When the network card 10 is in the power-saving mode, the mode switching unit 22 switches the mode of the network card 10 to the normal mode based on a direction by the command judgment unit 14. In the embodiment, the mode switching unit 22 increases a processing speed of the CPU from a processing speed in the power-saving mode in a stepwise manner in accordance with an operation command. For example, the processing speed of the CPU may be determined with reference to a data table in which processing speeds are determined in accordance with task processing indicated by an operation command.

The command transmission direction unit 20 is a transmission unit and detects whether the scanner device 30 is in the normal mode or the power-saving mode. If the command transmission direction unit 20 detects that the scanner device 30 is in the normal mode, the command transmission direction unit 20 transmits a transmission direction to the command storage unit 16 in order to transmit a command stored in the command storage unit 16 to the scanner device 30.

The command storage unit 16 stores commands which do not request a scanning operation, which have been judged by the command judgment unit 14, as a DB. Further, after the command storage unit 16 transmits the commands stored therein to the scanner device 30 in the order of being stored in accordance with the transmission direction transmitted from the command transmission direction unit 20, the command storage unit 16 erases the transmitted commands from the DB.

In the embodiment, if the mode of the scanner device 30 is changed, the scanner device 30 notifies the network card 10 of the mode change. With the notification, the command transmission direction unit 20 detects a mode of the scanner device 30. Accordingly, unless the command transmitted from the client device 40 is an operation command, when the scanner device 30 is in the power-saving mode, a transmission direction is not transmitted from the command transmission direction unit 20. Therefore, in such state, the commands transmitted from the client device 40 are sequentially stored in the command storage unit 16. Then, in a case where a user operates the operation panel 32 to operate the scanner device 30, a case where a user opens a document cover, or a case where a document is set on the ADF, the scanner device 30 transitions from the power-saving mode to the normal mode. With a mode change notification issued after that, the command transmission direction unit 20 transmits a transmission direction to the command storage unit 16.

As a result of that, the commands stored in the command storage unit 16 are transmitted to the scanner device 30. Then, until the scanner device 30 transitions to the power-saving mode again and a mode change notification is issued after a predetermined period of time has passed, the command stored in the command storage unit 16 is immediately transmitted to the scanner device 30. It is to be noted that the method of detecting the mode of the scanner device 30 is not limited to a notification from the scanner device 30 and a mode of the scanner device 30 may be detected at a predetermined time interval.

Next, FIG. 2 is a flowchart illustrating flows of processing an operation command in the scanner device 30, the network card 10 and the client device 40.

The scanner device 30 is set to start up in the normal mode when booted. Further, the network card 10 starts up in the normal mode if the scanner device 30 is booted.

At first, the scanner device 30 transitions to the power-saving mode when an operation direction is not obtained within a predetermined period of time after booted (step S100). Then, the scanner device 30 notifies the network card 10 of information indicating that a mode of the scanner device 30 has transitioned (step S102). Subsequently, the network card 10 transitions to the power-saving mode based on the transition information of the scanner device 30 to the power-saving mode, which is transmitted from the scanner device 30 (step S104).

In a state where the scanner device 30 and the network card 10 are in the power-saving mode, a user operates the client device 40 so as to request a first scanning operation (step S106). The client device 40 transmits an operation command 1 defining a scanning operation to the network card 10 (step S108). If the network card 10 receives the operation command 1, the network card 10 analyzes the command transmitted from the client device 40 to judge that the command is an operation command (judging process). Then, the network card 10 changes a processing speed of the CPU to a processing speed 1 in order to transition from the power-saving mode to the normal mode (step S110) (switching process). It is to be noted that the processing speed 1 is faster than a processing speed in the power-saving mode.

Further, the network card 10 transmits a mode transition notification indicating that the network card 10 has transitioned from the power-saving mode to the normal mode to the scanner device 30 (step S112) (first transmitting process). When the scanner device 30 receives the mode transition notification, the scanner device 30 starts processing of transitioning from the power-saving mode to the normal mode (step S114). Then, the scanner device 30 transmits a mode transition notification to the network card 10 indicating that the scanner device 30 has transitioned to the normal mode (step S116).

If the network card 10 receives the transition notification from the scanner device 30, the network card 10 transmits the operation command 1 to the scanner device 30 (step S118). Then, the scanner device 30 receives the operation command 1 and executes scan 1 in accordance with the command (step S120).

Subsequently, in a state where the scanner device 30 and the network card 10 are in the normal mode, a user operates the client device 40 so as to request a subsequent scanning operation (step S121). In this case, the scanning operation is supposed to be a complicated operation in comparison with the first scanning operation. The client device 40 transmits an operation command 2 defining the scanning operation to the network card 10 (step S122). If the network card 10 receives the operation command 2, the network card 10 analyzes the command transmitted from the client device 40 to change a processing speed of the CPU to a processing speed 2 (step S123). It is to be noted that the processing speed 2 is faster than the processing speed 1. Subsequently, the network card 10 transmits the operation command 2 to the scanner device 30 (step S124). Then, the scanner device 30 receives the operation command 2 and executes scan 2 in accordance with the command (step S125).

Next, FIG. 3 is a flowchart illustrating flows of processing a non-operation command in the scanner device 30, the network card 10 and the client device 40.

First, the scanner device 30 transitions to the power-saving mode when an operation direction is not obtained within a predetermined period of time after booted (step S130). Then, the scanner device 30 notifies the network card 10 of information indicating that a mode of the scanner device 30 has transitioned (step S132). Subsequently, the network card 10 transitions to the power-saving mode based on the transition information of the scanner device 30 to the power-saving mode, which is transmitted from the scanner device 30 (step S134).

In a state where the scanner device 30 and the network card 10 are in the power-saving mode, a user operates the client device 40 so as to update a push scan method (step S136). The client device 40 transmits a notification that the push scan method has been updated to the network card 10 (step S138). Then, the network card 10 analyzes a command transmitted from the client device 40 to judge that the command is a non-operation command which does not need to be transmitted to the scanner device 30 immediately. As a result of the judgment, the network card 10 updates a DB in which commands transmitted from the client device 40 are stored (step S140) (storing process).

Subsequently, the user operates the operation panel 32 on the scanner device 30 (step S142). In response to the operation, the scanner device 30 transitions from the power-saving mode to the normal mode and notifies the network card 10 of information indicating that the mode of the scanner device 30 has transitioned (step S144). If the network card 10 receives the notification indicating that the mode of the scanner device 30 has transitioned, the network card 10 transitions from the power-saving mode to the normal mode (step S146).

Further, if the mode of the scanner device 30 has transitioned to the normal mode, the command transmission direction unit 20 of the network card 10 directs the command storage unit 16 to transmit the DB (transmission direction process). If the command storage unit 16 receives the direction, the command storage unit 16 transmits a notification indicating that the DB has been updated to the scanner device 30 (step S148) (second transmitting process). In this case, pieces of information are sequentially notified to the scanner device 30 in the order of being transmitted from the client device 40.

Subsequently, after the scanner device 30 has received the notification indicating that the DB of the command storage unit 16 has been updated, a DB of the scanner device 30 is updated at a predetermined timing (step S150). Then, display of information relating to a push scan method among pieces of information which are displayed on the operation panel 32 is updated based on the updated DB (step S152).

Next, in a state where the scanner device 30 and the network card 10 are in the normal mode, a user operates the client device 40 so as to update a push scan method (step S154). The client device 40 transmits a notification that a push scan method has been updated to the network card (step S156). Then, the network card 10 analyzes a command transmitted from the client device 40 to judge that the command is a non-operation command. As a result of the judgment, the network card 10 updates a DB in which commands transmitted from the client device 40 are stored (step S158). At this time, since the scanner device 30 is in the normal mode, the network card 10 transmits a notification indicating that the DB has been updated to the scanner device 30 immediately (step S160).

Subsequently, the scanner device 30 receives the notification indicating that the DB of the network card 10 has been updated and updates a DB of the scanner device 30 in accordance with the notification (step S162). Further, display of information relating to a push scan method among pieces of information which are displayed on the operation panel 32 is updated based on the updated DB (step S164).

According to the above-described embodiment, the following effects can be obtained.

1. If a command transmitted from the client device 40 to the scanner device 30 is a command indicating an operation direction of the scanner device 30, even when the network card 10 is in the power-saving mode, the network card 10 analyzes the command so as to make the network card 10 itself transition to the normal mode. Then, the network card 10 notifies the scanner device 30 of the transition to the normal mode so that the scanner device 30 transitions to an operable state. Thereafter, the network card 10 transmits the command to the scanner device 30 and the scanner device 30 executes an operation in accordance with the command. Accordingly, since the network card 10 in the power-saving mode transitions to the normal mode in accordance with the command, power can be efficiently consumed. In addition, even when the scanner device 30 and the network card 10 are in the power-saving mode, the network card 10 itself transitions to the normal mode first without waiting until the scanner device 30 transitions to the normal mode. Therefore, necessary processing can be performed quickly.

2. The network card 10 transitions to the normal mode in a stepwise manner in accordance with a command indicating an operation direction. Therefore, a speed of processing a task can be changed depending on the operation directions. This makes it possible to perform processing with appropriate power consumption in accordance with the operation direction.

3. If a command transmitted from the client device 40 to the scanner device 30 is a command indicating no operation direction of the scanner device 30, the command is temporarily held in the network card 10. Then, the command is transmitted to the scanner device 30 after the scanner device 30 transitions to the normal mode. Accordingly, the scanner device 30 in the power-saving mode remains in the power-saving mode without transitioning to the normal mode in response to a non-urgent command. Therefore, power consumption of the scanner device 30 can be reduced.

4. Further, the scanner device 30 in the power-saving mode does not transition to the normal mode in response to a non-urgent command. Therefore, the network card 10 dependent on the scanner device 30 also remains in the power-saving mode, whereby power consumption of the network card 10 is reduced.

Hereinbefore, the invention has been described with reference to the embodiment as illustrated in the drawings. However, the invention is not limited to the embodiment and the following modification can be expected.

1. An information processing apparatus to which the network card 10 is attached is not limited to the scanner device 30 and can be supposed to be various types of apparatuses including a printer and a projector. Further, the communication apparatus is not limited to communication through a network and can be applied to any methods as long as communication is realized in accordance with a predetermined protocol.

Further, an apparatus with which the above method is executed is realized with a single apparatus in some case or with a plurality of apparatuses in combination in other cases. That is to say, various types of modes are encompassed.

The entire disclosure of Japanese Patent Application No. 2010-021891, filed Feb. 3, 2010 is expressly incorporated by reference herein.

What is claimed is:

1. A communication apparatus which is connected to an information processing apparatus so as to operate dependent on the information processing apparatus and connects the information processing apparatus and an external apparatus so as to allow communication therebetween, comprising:
    a judgment unit which acquires and analyzes instruction information transmitted from the external apparatus to the information processing apparatus, judges whether the instruction information is an instruction for directing the information processing apparatus to execute a predetermined operation, and transmits the instruction information to the information processing apparatus if the instruction information is an instruction for directing the predetermined operation;
    a storage unit which stores the instruction information if the judgment unit judges that the instruction information is an instruction not for directing the predetermined operation;
    a transmission unit which detects whether the information processing apparatus is in a normal state in which power is consumed normally or a power-saving state in which power consumption is reduced, and transmits the instruction information stored by the storage unit to the information processing apparatus when the information processing apparatus is in the normal state; and
    a switching unit which switches the communication apparatus to a normal state in which power is consumed normally if the judgment unit judges that the instruction information is an instruction for directing the predetermined operation when the communication apparatus is in a power-saving state in which power consumption is reduced;
    wherein the power-saving state is a state in which a speed of processing a task is reduced.

2. The communication apparatus according to claim 1, wherein the switching unit switches the communication apparatus to the normal state from the power-saving state in a stepwise manner in accordance with an instruction for directing the predetermined operation.

3. The communication apparatus according to claim 1, wherein if the transmission unit detects that the information processing apparatus has transitioned from the power-saving state to the normal state, the transmission unit transmits the instruction information stored by the storage unit to the information processing apparatus immediately.

4. The communication apparatus according to claim 1, wherein the storage unit is detachably attached to the communication apparatus.

5. A method of controlling a communication apparatus which is connected to an information processing apparatus so as to operate dependent on the information processing apparatus and connects the information processing apparatus and an external apparatus so as to allow communication therebetween, comprising:

- judging whether an instruction information is an instruction for directing the information processing apparatus to execute a predetermined operation by acquiring and analyzing instruction information transmitted from the external apparatus to the information processing apparatus;
- first-transmitting the instruction information to the information processing apparatus if the instruction information is judged to be an instruction for directing the predetermined operation in the judging;
- storing the instruction information if the instruction information is judged to be an instruction not for directing the predetermined operation in the judging;
- second-transmitting the instruction information stored in the storing to the information processing apparatus when the information processing apparatus is in a normal state by detecting whether the information processing apparatus is in the normal state in which power is consumed normally or a power-saving state in which power consumption is reduced; and
- switching the communication apparatus to the normal state in which power is consumed normally if the instruction information is judged to be an instruction for directing the predetermined operation in the judging when the communication apparatus is in the power-saving state in which power consumption is reduced;
- wherein the power-saving state is a state in which a speed of processing a task is reduced.

* * * * *